F. L. ADAMS.
DISTRIBUTER.
APPLICATION FILED JULY 19, 1916.

1,247,480.

Patented Nov. 20, 1917.

Witness
Hugh H. Ott

Inventor
F. L. Adams,
By Victor J. Evans
Attorney

UNITED STATES PATENT OFFICE.

FRANK L. ADAMS, OF RADNOR, OHIO, ASSIGNOR, BY MESNE ASSIGNMENTS, TO HIMSELF AND CHARLES E. KAGAY, OF RICHWOOD, OHIO.

DISTRIBUTER.

1,247,480. Specification of Letters Patent. Patented Nov. 20, 1917.

Application filed July 19, 1916. Serial No. 110,170.

*To all whom it may concern:*

Be it known that I, FRANK L. ADAMS, a citizen of the United States, residing at Radnor, in the county of Delaware and State of Ohio, have invented new and useful Improvements in Distributers, of which the following is a specification.

The invention relates to a distributer designed for use with silos and adapted in use to permit the operator to distribute the incoming ensilage to any particular part of the silo.

The invention comprehends a collapsible curved delivery spout mounted for a bodily rotative movement, the rotative movement of the spout and also the telescoping thereof being directly controlled and at the will of the operator, so that he is enabled to distribute the ensilage to the wall of the silo, directly to the center thereof, or at any intermediate point at will.

The invention in the preferred form of details will be described in the following specification, reference being had particularly to the accompanying drawings, in which.

Figure 1:
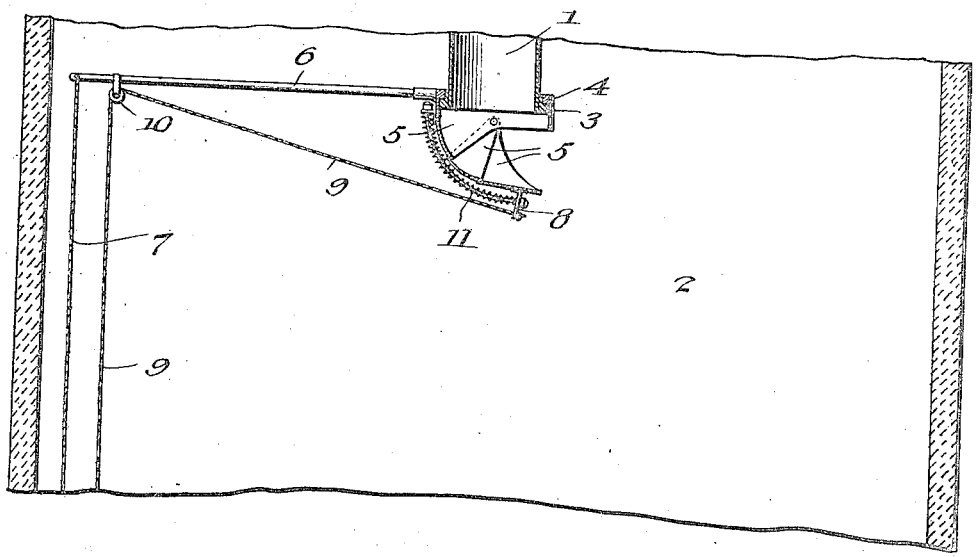
Figure 1 is a vertical sectional view showing the improved distributer in place, the silo being partly broken away.
Figure 2:
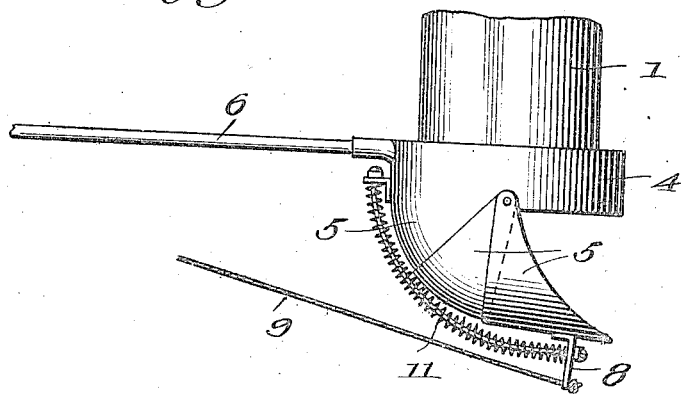
Fig. 2 is a side elevation of the distributer.

In the accompanying drawings, the pipe 1, by which the material is delivered from the cutter or other machine, leads into the upper end of the silo 2, preferably in the center thereof. The delivery end of the pipe 1 is provided with a flange collar 3 on which is rotatably mounted a reverse flange collar 4. Secured to the flange collar 4 is the distributer proper, comprising a series of pivotally connected sections 5, arranged for pivotal telescoping, in an obvious manner. The sections 5 are so formed that when extended, they constitute a curved delivery spout, the line of feed of which is approximately at right angles to the direction of entry of the ensilage through the pipe 1.

Secured to the collar 4 is an operating arm 6, terminally provided with an operating cable 7. Secured to the lowermost section of the telescopic spout is a bracket 8, with which is connected one terminal of a cable 9 which passes over a pulley 10 depending from the arm 6 with its free terminal adjacent the terminal of the cable 7. If desired a spring 11 may be connected to the collar 4 and by the bracket 8, the spring being guided and mounted in any suitable manner so as to normally maintain the sections of the spout extended to the limit.

In use, it being understood that the parts are so positioned that the arms 6 and cables 7 and 9 are arranged within the silo, the operator walking around within the silo, will by means of the cable 7, turn the distributer so that the ensilage is delivered in circular layers adjacent the wall of the silo, the operator in his travel around the interior of the silo tramping the material down adjacent the wall and thus tending to prevent air leaks at this point. If the operator desires to deliver the ensilage centrally of the silo, then by operating the cord 9, collapse the distributing spout so that the material is delivered practically in direct line with the feeder pipe 1. The ensilage, of course, may be delivered at any point intermediate the wall of the silo and the center thereof by adjusting the telescoped relation of the sections of the distributer spout to the desired extent.

With the construction described, the operator is enabled to place the ensilage at any desired point or points within the silo, insuring that the heavy as well as the light material will be together directed to the proper point and thus prevent gravital separation of these parts as in the ordinary delivery.

What is claimed is:

The combination with an ensilage feed pipe, of a discharge spout therefor, comprising a collar rotatably mounted upon the end of the pipe, a collapsible spout section carried by the collar and having a discharge opening, an arm for turning the discharge spout on the pipe, said arm projecting from the collar in a direction opposite the discharge from the opening, an operating cord attached to the arm for moving the same, and an operating cord having a guided connection on the arm and leading to the collapsible spout section for adjusting the same.

In testimony whereof I affix my signature.

FRANK L. ADAMS.

Copies of this patent may be obtained for five cents each, by addressing the "Commissioner of Patents, Washington, D. C."